United States Patent Office 2,774,802
Patented Dec. 18, 1956

2,774,802

SEPARATION OF ALKYL BENZENES BY SELECTIVE CLATHRATION OF THE PARA-ISOMER WITH A 4-ALKYL PYRIDINE WERNER COMPLEX IN THE PRESENCE OF A 3-SUBSTITUTED PYRIDINE

Curtis G. Christian, Anaheim, Calif., assignor to Union Oil Company of California, Los Angeles, Calif., a corporation of California No Drawing. Application November 8, 1954,
Serial No. 467,655

8 Claims. (Cl. 260—674)

This invention relates to methods for purifying or resolving mixtures of difficultly separable alkyl benzenes, e. g. xylenes, cymenes, ethyl toluenes and the like. The methods are particularly applicable to the resolution of alkyl benzene mixtures which contain at least one para-dialkyl benzene, and an isomeric monoalkyl benzene. Broadly stated, the method consists in contacting the mixture to be resolved with a solid Werner complex composed of a metal salt coordinated with a 4-lower-alkyl substituted pyridine, in the presence of a 3-substituted pyridine. Preferably the 3-substituent is selected from the group consisting of —CONH$_2$, —CO-alkyl, —COO-alkyl, —CSNH$_2$, and —CN. It is found that under such contacting conditions, the para-dialkyl benzenes are selectively integrated into the crystal structure of the Werner complex, forming what is regarded as a "clathrate" compound. The absorption of the para-isomer is in strong preference to the absorption of the corresponding monoalkyl benzene isomer and the meta-isomer. Any ortho-isomer present in also less readily absorbed.

It has recently been shown that the Werner complexes of 4-alkyl pyridines are capable of clathrating p-xylene and ethylbenzene in preference to ortho- and meta-xylenes. However such complexes alone are relatively ineffective for separating ethylbenzene from p-xylene. It has now been found that certain 3-substituted pyridines exert a synergistic effect on such clathration procedures, altering the selectivity of absorption of the various isomers, and in general improving the selectivity for para-xylene, especially relative to ethylbenzene.

The cause of the synergistic effect is not known with certainty. It appears possible that a mixed Werner complex could be formed, each molecule of which would contain both 3- and 4-substituted pyridine molecules coordinated around the metal atom. Alternatively, a heteromolecular mixture of Werner complexes may be formed, each molecule of which contains only the same type of pyridine molecules. A still further possibility is that the 3-substituted pyridine does not completely coordinate and is in part selectively clathrated in preference to ethylbenzene. The latter possibility seems most likely in those cases where sufficient 4-alkyl pyridine is present to completely satisfy the coordinating capacity of the metal salt. It is observed that the 4-alkyl pyridines apparently form more stable complexes than do the above 3-substituted pyridines. The results described herein are not however to be construed as restricted to any of the above theoretical explanations, all of which may be partly or wholly erroneous.

The operative metal salts for use herein comprise any of the transitional metal salts capable of forming tetracoordinate complexes with pyridine bases. A preferred subgroup consists of the monovalent anion salts of di-valent metals of atomic number 25 to 28, i. e. manganese, iron, cobalt and nickel. The tetra-coordinated substi-tuted-pyridine complexes of these preferred salts are found to exhibit good capacity and selectivity for clathrating alkyl benzenes. Specific examples of such salts include:

Nickelous thiocyanate
Nickelous azide
Nickelous cyanate
Nickelous bromide
Nickelous isocyanate
Cobaltous thicyanate
Cobaltous nitrite
Cobaltous cyanide
Ferrous thiocyanate
Ferrous cyanide
Ferrous nitrite
Manganous thiocyanate
Manganous chloride
Manganous formate
Manganous acetate
Manganeous nitrite The total proportion of pyridine bases present during clathration should be at least four moles per mole of metal salt. Preferably a total molar excess of pyridine base is present; any increment over the stoichiometric amount required to yield tetra-coordinate complexes is beneficial in improving the weight-for-weight capacity (efficiency) of the solid complex for absorbing hydrocarbons. Suitable excess proportions may range between about 0.01 and 10 parts per part of tetra-coordinate complex by weight, and preferably between about 0.1 and 0.6 part per part of complex. The optimum proportion will vary somewhat for each particular complex, and for the particular clathration procedure employed. In each case however, the optimum proportion may be easily determined by simply measuring the clathrating capacity of a graduated series of mixtures containing varying proportions of pyridine bases, and interpolating or extrapolating to define the optimum mixture, i. e. the one which will clathrate the largest weight-ratio of the particular feed component.

The 4-alkyl pyridine employed herein may be for example, 4-methyl pyridine, 4-ethyl pyridine, 4-n-propyl pyridine, 4-isopropyl pyridine, 4-n-butyl pyridine, 4-n-hexyl pyridine or the like. The 3-substituted pyridine employed in conjunction therewith is preferably a nicotinic acid derivative, e. g. nicotinamide, 3-methyl pyridyl ketone (3-acetyl pyridine), methyl nicotinate, ethyl nicotinate, thionicotinamide, nicotinonitrile or the like. It will be noted that all of these 3-substituted pyridines contain substitutents in the 3-position which are substantially neutral and do not exhibit marked coordinating capacity; in all cases the heterocyclic N atom is the strongest coordinating group.

The mole-ratio of 4-substituted pyridine to 3-substituted pyridine present during clathration may vary widely, from about 0.1/1 to 10/1, and in all cases it will be found that the clathrated hydrocarbons will contain a higher ratio of p-xylene/ethylenbenzene than is obtained under like conditions when equivalent amounts of either of the pyridine bases is employed singly. It appears that in most cases the optimum selectivity and efficiency (efficiency=moles of hydrocarbon clathrated÷moles of Werner complex×100) is obtained when the mole-ratio of 4-substituted pyridine to 3-substituted pyridine is between about 0.2/1 and 5/1. All of the above stated ratios of pyridine bases are inclusive of the portion thereof which is actually coordinated in the Werner complex. These effective ratios may be obtained by preforming a tetra-coordinated Werner complex with either or both of the pyridine bases and performing the clathration in the presence of an added excess of one, or the Werner complex may be formed simultaneously with the clathration by simply admixing the desired metal salt, pyridine bases and feed mixture.

The tetra-coordinated Werner complexes may be prepared by any of several different methods. According to one method they may be formed by precipitation from an aqueous solution. This is ordinarily accomplished by first forming in solution the desired metal salt and then adding thereto about four molar equivalents of the desired pyridine base or bases. The insoluble complex thereupon precipitates and is removed and dried. The drying may be accomplished in a stream of air at room temperature, or slightly elevated temperatures may be employed. The substantially dry, powdered or granular complex may then be employed directly in the separation techniques described herein.

The amount of complex employed, relative to the feed mixture, depends upon its specific capacity for absorbing the particular isomer concerned, and also upon the proportion of that isomer present in the original mixture. The complexes are found in general to be capable of absorbing between about 5% and 70% by weight of absorbable compounds. Optimum efficiency may require that more or less than this "stoichiometric" amount of complex be employed, depending upon its relative capacity for other components in the mixture to be resolved, and the number of clathration stages which are permissible. In general, the amount of complex to be employed may vary between about 0.25 and 20 parts by weight per part of clathratable component in the mixture. Smaller proportions of complex will generally yield a purer absorbate, while the larger proportions result in more complete removal of p-dialkyl benzene from the mixture, on the basis of a single-stage batch absorption.

The procedural steps involved herein may be briefly summarized as follows:

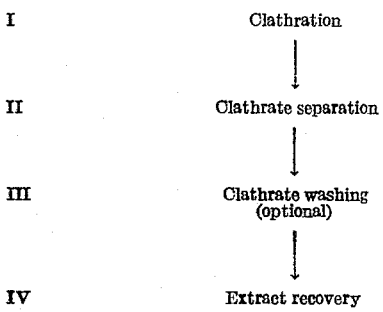

I      Clathration

II      Clathrate separation

III      Clathrate washing (optional)

IV      Extract recovery

The first step in the process, indicated at I above, is designated "clathration." This step involves essentially a contacting of the feed mixture to be separated with the particular Werner complex which is to be employed. This contacting may be performed by either of two general methods.

The first method consists in merely contacting and agitating the dry, solid Werner complex with the liquid feed mixture and excess pyridine base, whereupon the clathratable components of the feed mixture are absorbed into the solid complex, forming the clathrate. Any suitable temperature may be maintained during clathration, e. g. from −50° to +150° C. Preferably room temperatures are employed. In this method, it may be desirable in some cases to dilute the feed components with a thinner which is not a solvent for the Werner complex in order to facilitate the agitation and handleability of the resulting slurry. Hydrocarbon thinners are preferred for this purpose. In other cases the feed mixture may be sufficiently lean in the component which is to be absorbed in clathrate form that an extraneous thinner is unnecessary. In still other cases, sufficient excess pyridine base may be employed to act as a thinner. In any case it is usually desirable that sufficient fluid be present to form a slurry which may be easily stirred, as with a propeller, or in a colloid mill. If no thinner is employed, the solid clathrate which is filtered or otherwise separated from the lean feed residue will contain an interstitial phase composed primarily of lean feed residue plus excess nitrogen base. If a thinner is employed, the interstitial phase will consist of thinner, lean feed residue and pyridine base.

The second general method for performing the clathration step consists in dissolving the Werner complex and pyridine bases in a solvent such as propylene glycol, methyl Cellosolve, or chloroform, adding the feed mixture, and then altering the physical environment of the resulting solution, as by cooling, in such manner as to precipitate the Werner complex. The dissolving step may be performed at elevated temperatures e. g. 50°–200° C., and the precipitation may be accomplished by cooling to e. g. 0°–40° C. Any differential set of temperatures may be employed. In precipitating, the complex selectively absorbs the p-dialkyl benzene, forming a clathrate. As recovered by filtration or centrifuging, the clathrate contains an interstitial phase consisting of solvent plus lean feed mixture and pyridine bases.

A particularly valuable group of solvents for these purposes are the lower aliphatic monohydroxy compounds containing at least three carbon atoms, especially glycol mono-ethers. Specific glycol monoethers include for example the methyl, ethyl, isopropyl, n-propyl, isobutyl, n-butyl, tert-butyl, isoamyl, amyl, and hexyl monoethers of ethylene glycol, diethylene glycol, triethylene glycol, 1,2-propylene glycol, 1,3-propylene glycol, polypropylene glycols, 1,2-butylene glycol, 1,3-butylene glycol, 2,3-butylene glycol, 1,4-butylene glycol, etc. The lower alkyl diethers of glycerol and other polyhydroxy compounds may also be employed. In addition the aliphatic mono-alcohols containing more than three carbon atoms may also be employed, including n-butyl alcohol, isobutyl alcohol, sec.-butyl alcohol tert-butyl alcohol, isoamyl alcohol, n-amyl alcohol, hexyl alcohols, heptyl alcohols, octyl alcohols, nonyl alcohols, decyl alcohols, etc. A preferred group of solvents are those aliphatic or cycloaliphatic compounds which contain one hydroxyl group and at least one ether linkage. The various Cellosolve derivatives of ethylene glycol or propylene glycol are particularly suitable, from methyl to butyl Cellosolve. Other materials such as water, ethanol, or hydrocarbons may also be added in some cases to modify the solvent properties of the primary solvent.

Another valuable group of solvents are the lower aliphatic dihydroxy or trihydroxy compounds, especially glycols. Such solvents include for example, ethylene glycol, 1,2-propylene glycol, 1,3-propylene glycol, diethylene glycol, triethylene glycol, dipropylene glycol, glycerol, glycerol monoethers, 1,3-butanediol, 2,3-butanediol, 1,4-butanediol, 2-butene-1,4-diol, and mixtures of these and similar materials. Other materials such as water, ethanol, or hydrocarbons may also be added in some cases to modify the solvent properties of the polyhydroxy compounds.

The separation step II may be performed in any suitable manner, as by filtration, centrifuging, decantation, or by liquid-liquid phase separation wherein the solid clathrate is either suspended or dissolved in one of the phases. In any case, the separated liquid raffinate contains most of the excess pyridine bases employed. This raffinate is then treated by conventional separation procedures, e. g. distillation, azeotropic distillation, solvent extraction, etc., to resolve it into the separate fractions, pyridine bases, lean feed and solvent or thinner as the case may be. The pyridine bases and the solvent or thinner fractions are then recycled to the clathration step. Actually it is not necessary to separate the pyridine bases from the solvent or thinner; both components may be recovered as a single fraction and recycled. The lean feed fraction may be disposed of in any desired manner, or may be treated in further clathration stakes to recover any remaining clathratable components therein.

The separated clathrate from step II contains the absorbed phase, or extract, relatively rich in p-dialkyl benzene. As indicated above, it also contains an interstitial phase composed of solvent or thinner, lean feed residue and excess pyridine bases. The washing step indicated at III is designed primarily for removing the interstitial phase. This step may be omitted if desired, but to obtain maximum purity, i. e., to reduce the proportion of relatively non-clathratable components in the extract to a minimum, it is preferable to remove the interstitial phase before recovering the extract. The washing step III is intended to include broadly any method for removing the interstitial phase. Such methods include for example steam-stripping, vapor-stripping, or washing with a solvent which is more readily separable from the clathrated phase than was the original interstitial phase. Suitable solvents include for example paraffinic hydrocarbon fractions in the pentane to heptane range. The interstitial phase, as recovered by washing or stripping, may then be treated along with the above-described raffinate, or separately, to recover the pyridine bases, lean feed and solvent or thinner fractions.

The washed clathrate is then subjected to treatment for recovery of the clathrated phase, or "extract" in step IV. Several methods may be employed for recovering the extract. One method consists of steam or vapor-stripping. The extract may also be recovered by simply destroying the Werner complex, as by treatment with acid. It is ordinarily preferable however to recover the complex in a form suitable for recycling to step I of the process. Another method for recovering the extract consists in dissolving the clathrate in a solvent, preferably a high-boiling solvent such as ethylene glycol, diethylene glycol, methyl Cellosolve, butyl Cellosolve, propylene glycol, butylene glycol, glycerol ethers, etc., and then distilling the solution to recover the extract which is liberated from the clathrate. In this latter method the extract may be recovered in substantially pure form, or as an azeotrope with the solvent. After recovery of the extract the solid complex is ordinarily recovered by cooling the solvent. In most cases additional feed mixture and recycle pyridine bases may be added before the complex is precipitated, thereby again forming a clathrate with the clathratable components of the feed mixture. Any other suitable method for recovering the extract from the clathrate may be employed.

In order to further illustrate the invention the following examples are cited, which should be considered as illustrative only and not limitative:

EXAMPLE I

A sample of nickel tetra (nicotinamide) dithiocyanate was prepared as follows: About 48.8 gms. of nicotinamide (0.4 mole) was dissolved in 100 ml. of water, forming solution A. A second aqueous solution B was prepared containing 23.8 gms. (0.1 mole) of $NiCl_2 \cdot 6H_2O$ and 16.2 gms. (0.2 mole) of NaSCN. Solutions A and B were then mixed whereupon heat was generated and a blue precipitate formed which coalesced into an immiscible viscous liquid layer. The mixture was cooled, decanted, and the viscous liquid washed twice with water. More water was then added and the mixture was heated. Upon cooling a pale blue solid was formed which was recovered by filtration, washed and dried at 110° C. The dried material melted at 194° C. with decomposition, and was found to contain 9.5 wt. % nickel (calculated 8.86%) and 19.9% nitrogen (calculated 21.1%).

A series of experiments were carried out to test the effectiveness of the above complex for selective clathration of xylenes in the presence of an excess of various extraneous pyridine bases. In each experiment fifteen grams o fthe nickel tetra (nicotinamide) dithiocyanate, 20 ml. of mixed xylenes, and the indicated proportion of excess pyridine base were mixed and heated with about 70 ml. of methyl Cellosolve until at least most of the solid complex had dissolved. The hot mixtures were then cooled in an ice bath to precipitate the solid clathrates. The clathrates were recovered by filtration, washed with 20 ml. of isooctane, and decomposed with aqueous HCl. The acidic mixtures were then extracted with 40 ml. portions of isooctane to recover the previously clathrated hydrocarbons. The hydrocarbon phases were then washed with HCl and water, and subjected to analysis for xylene isomer content. (Xylene analyses throughout are by ultra-violet absorption spectrum analyses.) The results were as follows:

Table 1

| Exp. | Excess pyridine base | Wt. Ratio, Werner complex excess base | Composition of extract, Vol. Percent | | | | Percent[1] Recovery | Percent Efficiency |
| --- | --- | --- | --- | --- | --- | --- | --- | --- |
| | | | p-xyl. | m-xyl. | o-xyl. | Et. Bz. | | |
| 1 | none | | 26.4 | 43.1 | 18.0 | 12.5 | <1 | <1 |
| 2 | nicotinamide | 1.1 | 22.3 | 43.9 | 19.8 | 14.0 | <1 | <1 |
| 3 | 4-methyl pyridine | 7.9 | 44.5 | 29.7 | 16.6 | 9.2 | 0.9 | 1.2 |
| 4 | do | 1.5 | 75.9 | 8.6 | 6.6 | 8.9 | 35 | 48.5 |
| 5 | 4-ethyl pyridine | 1.4 | 59.4 | 15.4 | 19.8 | 5.4 | 21 | 29 |
| 6 | do | 1.3 | 63.9 | 14.4 | 17.4 | 4.3 | 28 | 36 |
| Feed composition | | | 19.9 | 45.5 | 19.3 | 15.3 | | |

[1] Wt. Percent of feed p-xylene recovered.

Experiment 1 shows that the pure nicotinamide Werner complex has a low capacity for clathrating xylenes under these conditions, and effects only a slight resolution. Experiment 2 shows that by adding an excess of the same pyridine base, the efficiency is approximately the same, and there is no improvement in purity of product. Experiment 3 shows that when a slight excess of 4-methyl pyridine is added there is a slight improvement in efficiency and a marked improvement in purity. Experiments 4, 5 and 6 show that when larger excesses of 4-alkyl pyridine are added, both efficiency and purity are markedly improved. The progressively improving results in the above experiments may be attributed to the partial displacement of nicotinamide from the Werner complex by the excess 4-alkyl pyridine, thereby providing in effect an equilibrium mixture containing mixed Werner complexes and mixed excess pyridine bases.

EXAMPLE II

A sample of nickel tetra (4-ethylpyridine) dithiocyanate was prepared by adding 4 mole-proportions of 4-ethylpyridine to an aqueous solution containing 1 mole-proportion of $NiCl_2$ and 2 mole-proportions of NaSCN. The resulting blue solid was filtered off, washed and dried at about 100° C. Two 30 gm. portions of the dry complex were then subjected to clathration with 25 ml. portions of mixed xylenes in the presence of 50 gms. methyl Cellosolve solvent and a mole-excess of a pyridine base. Clathration and extract recovery procedures were similar to those described in Example I. The results were as follows:

methyl Cellosolve, and the solution was cooled to precipitate the clathrate. The clathrated hydrocarbons were Table 2

| Exp. | Excess pyridine base | Wt. Ratio, Werner complex pyridine base | Composition of Extract, Vol. Percent | | | | Percent Recovery | Percent Efficiency |
|---|---|---|---|---|---|---|---|---|
| | | | p-xyl. | m-xyl. | o-xyl. | Et. Bz. | | |
| 7 | 4-methyl pyridine | 3.3 | 58.9 | 23.8 | 9.9 | 7.4 | 52 | 46.3 |
| 8 | nicotinamide | 3.3 | 60.5 | 22.0 | 13.4 | 4.1 | 37.5 | 35.9 |
| Feed composition | | | 24.3 | 27.9 | 21.9 | 5.9 | | |

This experiment shows that when the pyridine base of the initial Werner complex is a 4-alkyl pyridine, and the excess base is a 3-substituted pyridine, a higher ratio of p-xylene/ethylbenzene is obtained in the extract than when the excess base is a 4-alkyl pyridine.

EXAMPLE III

A sample of nickle tetra (4-methyl pyridine) dithiocyanate was prepared by a method analogous to that of Example II. The 4-methyl pyridine complex was then tested in the same manner for clathrating mixed xylenes in the presence of methyl Cellosolve solvent and excess pyridine base. The excess base employed in Experiment 9 was 4-methyl pyridine (1.5 wt. ratio, complex/base). In Experiment 10 the excess base was nicotinamide, 5 parts plus 4-methyl pyridine, 1 part. (Total wt. ratio, complex/bases, 2.5.) The results were as follows:

Table 3

| Exp. | Composition of extract, Vol. percent | | | | Percent Recovery | Percent Efficiency |
|---|---|---|---|---|---|---|
| | p-xyl. | m-xyl. | o-xyl. | Et. Bz. | | |
| 9 | 69.7 | 11.1 | 5.5 | 13.7 | 86 | 52 |
| 10 | 73 | 8.6 | 7.4 | 11.0 | 40 | 45.5 |
| Feed | 19.9 | 45.5 | 19.3 | 15.3 | | |

This example shows again that the selectivity for p-xylene in preference to ethylbenzene is improved when an excess of 3-substituted pyridine is employed, as compared to the case where the clathration mixture contains only a 4-alkyl pyridine. It shows further that when there is a mole-excess of 4-alkyl pyridine plus a further excess of 3-substituted pyridine, the efficiency of the Werner complex is improved. (Compare Experiments 8 and 10.)

In some of the above examples it may appear that the improvement in extract purity is a result of operating at low recovery levels, i. e. of clathrating only a small portion of the available p-xylene. However, such does not appear to be the case, inasmuch as clathration at the same recovery levels with homogeneous pyridine base complexes and with the heterogeneous pyridine base complexes still shows a favorable purity factor for the latter, as shown by the following example:

EXAMPLE IV

*Experiment 11.*—Fifteen gms. of nickel tetra (4-ethylpyridine) dithiocyanate, 1 ml. of 4-ethylpyridine and 20 ml. of mixed xylenes were dissolved in 80 ml. of hot methyl Cellosolve and the solution was cooled to precipitate the clathrate. The clathrated hydrocarbons were then recovered as described in Example I.

*Experiment 12.*—Ten gms. of nickel tetra (nicotinamide) dithiocyanate, 8 ml. of 4-ethylpyridine and 13 ml. of mixed xylenes was dissolved in 40 ml. of hot methyl Cellosolve, and the solution was cooled to precipitate the clathrate. The clathrated hydrocarbons were then recovered as described in Example I. The results were as follows:

Table 4

| Exp. | Composition of extract, Vol. percent | | | | Percent Recovery | Percent Efficiency |
|---|---|---|---|---|---|---|
| | p-xyl. | m-xyl. | o-xyl. | Et. Bz. | | |
| 11 | 59 | 19.3 | 15.1 | 6.6 | 26 | 32 |
| 12 | 64 | 14.4 | 17.4 | 4.3 | 28 | 36 |
| Feed | 19.9 | 45.5 | 19.3 | 15.3 | | |

This example demonstrates that even at comparable recovery and efficiency levels, clathration in the presence of the mixed pyridine bases gives an extract richer in para-xylene and leaner in ethylbenzene than is obtained when clathration is carried out in the presence of the 4-alkyl pyridine complex alone.

When other 3-substituted pyridine bases are employed in place of nicotinamide, substantially the same favorable results are obtained. Likewise, when other alkyl benzenes are treated, a stronger preference is shown for the para-isomer as compared to the monoalkyl-substituted isomer. The invention should therefore not be considered as limited to the specific disclosure, or examples, since many variations may be made by those skilled in the art without departing from the scope or spirit of the following claims.

I claim:

1. A method for resolving a mixture of alkyl benzene hydrocarbons, said mixture containing at least one para-dialkyl benzene and a monoalkyl benzene, which comprises contacting said mixture with a solid Werner complex, said Werner complex being composed of a salt of a divalent transitional metal coordinated with a 4-alkyl pyridine, said contacting being carried out in the presence of a 3-substituted pyridine base selected from the group consisting of nicotinamide, lower alkyl 3-pyridyl ketones, lower alkyl esters of nicotinic acid, thionicotinamide and nicotinonitrile, whereby said para-dialkyl benzene is integrated into the crystal structure of said complex in stronger preference to said mono-alkyl benzene than would be the case in the absence of said 3-substituted pyridine.

2. A process as defined in claim 1 wherein said 3-substituted pyridine is nicotinamide, and said 4-alkyl pyridine is selected from the group consisting of 4-methyl pyridine and 4-ethylpyridine.

3. A method for resolving a mixture of C8 aromatic hydrocarbons comprising para-xylene and ethylbenzene which comprises contacting said mixture with a solid Werner complex, said Werner complex being composed of a salt of a divalent transitional metal coordinated with a 4-lower alkyl pyridine, said contacting being carried out in the presence of a 3-substituted pyridine base selected from the group consisting of nicotinamide, lower alkyl 3-pyridyl ketones, lower alkyl esters of nitcotinic acid, thionicotinamide and nitcotinnonitrile, whereby para-xylene is integrated into the crystal structure of said complex in stronger preference to ethylbenzene than would be the case in the absence of said 3-substituted pyridine.

4. A process as defined in claim 3 wherein said 3-substituted pyridine is nicotinamide, and said 4-lower alkyl pyridine is selected from the group consisting of 4-methyl pyridine and 4-ethyl pyridine.

5. A process as defined in claim 3 wherein the total proportion of said 4-lower alkyl pyridine plus said 3-substituted pyridine amounts to more than 4 moles per mole of said metal salt, and wherein the mols-ratio of 4-lower alkyl pyridine to 3-substituted pyridine is between about 0.1/1 and 10/1.

6. A method for resolving a mixture of $C_8$ aromatic hydrocarbons containing para-xylene and ethylbenzene which comprises forming a solution comprising (1) a solvent consisting essentially of an aliphatic hydroxy compound, (2) said xylene mixture, (3) a monovalent anion salt of a divalent metal having an atomic number of 25-28, (4) a 4-lower alkyl pyridine, and (5) a 3-substituted pyridine selected from the group consisting of nicotinamide, lower alkyl 3-pyridyl ketones, lower alkyl esters of nicotinic acid, thionicotinamide and nicotinonitrile, then cooling the resulting solution to precipitate a solid clathrate therefrom, and recovering para-xylene from said clathrate.

7. A process as defined in claim 6 wherein said metal salt is nickel thiocyanate, and said 3-substituted pyridine is nicotinamide.

8. A process as defined in claim 7 wherein said solvent is methyl Cellosolve.

References Cited in the file of this patent

Powell et al.: "Nature," vol. 163 (1949), pages 566-7.

Emeleus et al.: Modern Aspects of Organic Chemistry, D. Van Nostrand Co., 250 4th Avenue, New York, N. Y., page 10 (1952).